United States Patent [19]

LeVert

[11] 4,280,684
[45] Jul. 28, 1981

[54] MANUAL AUTOMOBILE PUSHER

[76] Inventor: Francis E. LeVert, 1909 Matthew La., Knoxville, Tenn. 37919

[21] Appl. No.: 87,325

[22] Filed: Oct. 23, 1979

[51] Int. Cl.³ .............................................. B60S 9/02
[52] U.S. Cl. .................................. 254/35; 254/86 R; 254/101; 254/103; 254/DIG. 1
[58] Field of Search .............. 254/35, 86 R, 101, 103, 254/DIG. 1, DIG. 4, 109

[56] References Cited

U.S. PATENT DOCUMENTS

| | | | |
|---|---|---|---|
| 128,165 | 6/1872 | Odenath | 254/35 |
| 862,609 | 8/1907 | Carberry | 254/86 R |
| 1,081,013 | 12/1913 | Bunn | 254/86 R |
| 2,743,903 | 5/1956 | Lucker | 254/109 X |
| 3,099,435 | 7/1963 | Nixon | 254/35 |
| 4,129,286 | 12/1978 | Anell | 254/103 |

*Primary Examiner*—Robert C. Watson

[57] ABSTRACT

A manual automobile pusher comprising a spur gear, a large metal gear that is welded to a metal lead screw which is mounted in an open equal sides metal channel, a long equal "leg" angle metal element connected to a large rectangular metal nut which is driven by the metal lead screw, a metal guide with an equal "leg" angle slot mounted on the open equal sides metal channel through which the equal "leg" angle metal element slides, a metal base connected as by a hexagonal head cap screw to the equal "leg" angle member, a metal crank with a non metalic hand handle connected to the spur gear, a bumper attachment connected by a pivot pin to a metal connecting linkage which is attached to the open equal sides metal channel and a belt to secure the manual pusher in a convenient position when it is not in use. The automobile pusher designed for seasonal attachment to either bumper of an automobile during inciliminate weather, is capable of developing sufficient horizontal force to push an automobile out of a rut in ice, snow, or mud thereby effecting a reduction in gasoline usage and wear on an automobile transmission or clutch.

1 Claim, 3 Drawing Figures

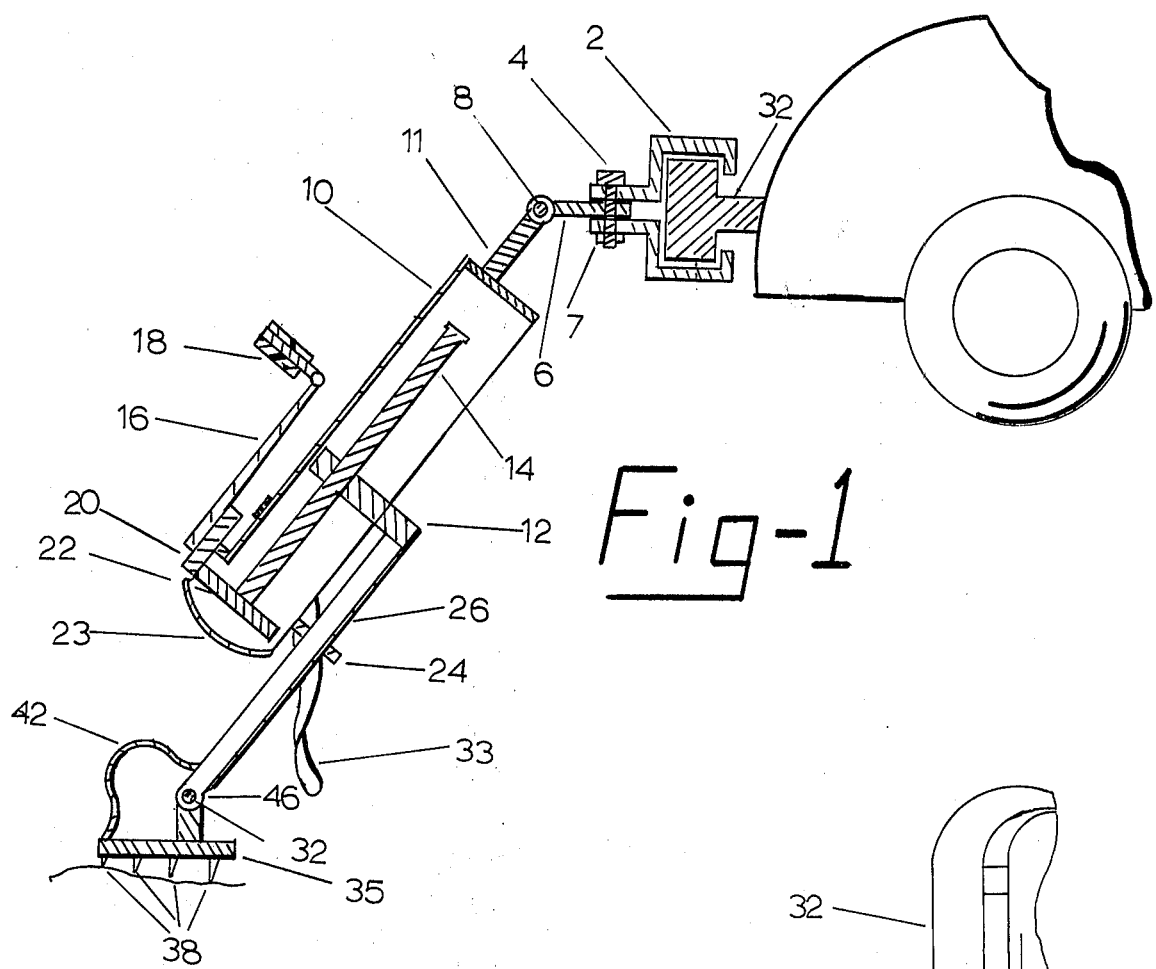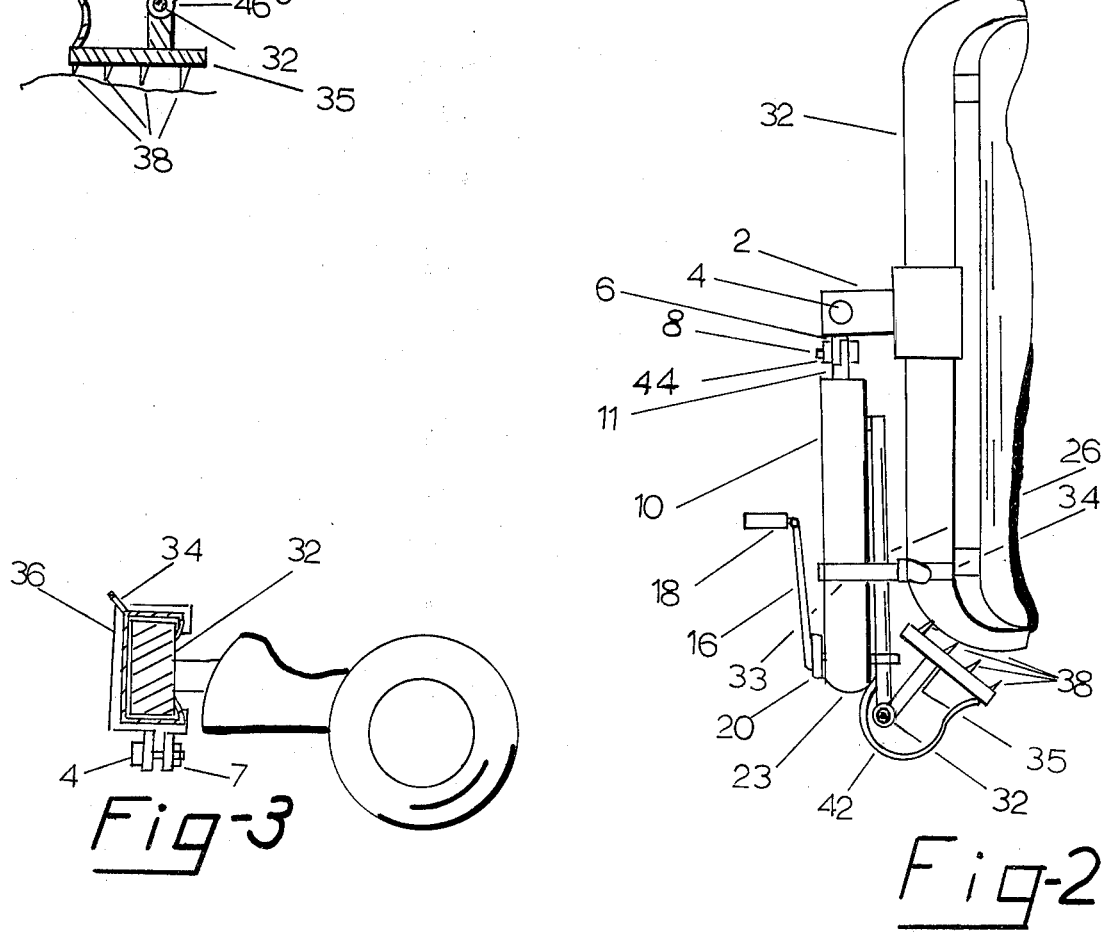

MANUAL AUTOMOBILE PUSHER

BACKGROUND OF THE INVENTION

Several patented devices exist which are designed to push vehicles out of ruts in snow, ice or mud. These are the patents of C. Buddingh (U.S. Pat. No. 3,029,065) and C. C. Nixon (U.S. Pat. No. 3,099,435) and the application of F. E. LeVert (Ser. No. 11,174, now U.S. Pat. No. 4,218,043). All of these devices require careful positioning and involve some inconvenience to the user. That is, the user must first secure the device from its storage location in his/her automobile and then the user must be able to firmly position the device so as to make good contact with the vehicle and the surface on which the vehicle is resting.

It would be useful to have a device for extracting an immobile vehicle from snow, ice and/or mud that could be temporary attached to the bumper of a vehicle during periods of inclimate weather. A device that could be attached in a secure but convenient manner to either bumper. A device that required little or no effort to be used. It is an object of the present invention to provide a method and means of extracting a vehicle from a rut. It is a further object of the present invention to make a lightweight automobile pusher for attachment, temporary, to a bumper of an automobile.

Other objects of this invention will become obvious in the course of the detailed description.

FIG. 1 is a sectional side view of the invention.
FIG. 2 is a top view of the invention.
FIG. 3 shows an alternate embodiment of the bumper latching mechanism.

DETAILED DESCRIPTION OF THE INVENTION

In FIG. 1, bumper latching mechanism 2 is attached to automobile bumper 32. Connecting linkage 6 is connected to the bumper latching mechanism 2 as by steel cap screw 4 which is in turn held in place by steel hexagonal nut 7. The connecting linkage 6 is attached to open equal sides metal channel (OESMC) 10 via metal rod 11 and steel cap screw 8. The metal rod 11 through its movement relative to said connecting linkage 6 allows the device to be moved in a vertical plane relative to the vehicle. The OESMC 10 is connected to high strength aluminum cap 23. Lead screw 14 which resides in said OESMC 10 is driven by gear 22. The gear 22 is fixed as by welding to said lead screw 14. Rotational motion is imparted to gear 22 by spur gear 20. The spur gear 20 is rigidly attached to crank 16 on which nonmetalic hand handle 18 is mounted. Said lead screw 14 drives large rectangular metal nut 12 which in turns drives equal "leg" angle metal element (ELAME) 26 in either an in or out direction. Equal "leg" angle sloted metal guide 24 is used to support and guide ELAME 26. ELAME 26 is connected to metal base 35 as by metal cap screw 32. Mounted on metal base 35 are metal studs 38 which provide non-slipping contact between the metal base 35 and the surface on which the car is resting. Metal spring 42 is used to provide a small force on the metal base in order to facilitate good non-slipping contact between a surface and said metal studs 38. Steel cap screws 8 and 32 are held in place by steel hexagonal nuts 44 and 46, respectively. Belt and buckle combination 33 which is attached to metal spring clamp 34 which in turn is connected to the bumper 2 is provided to hold the pusher against said bumper 2 when it is not in use.

The operation of the invention of FIG. 1 is such that a small force applied to said non-metalic handle 18 results in a large torque on said gear 22. The moment applied to said gear 22 is transmitted directly to said lead screw 14 which drives large rectangular metal nut in or out depending on whether said lead screw 14 is being driven in a clockwise or counter clockwise manner, respectively. When not in use the manual pusher is placed as shown in FIG. 2 and held in place by belt and buckle combination 33 which is connected to said bumper 2 as by metal spring clamp 34. The manual pusher may be positioned as shown in FIG. 3 with bumper latching mechanism 36 which could be used as well as said bumper latching mechanism 2.

The embodiments of the invention in which an exclusive property at privilege as claimed are defined as follows:

1. An apparatus for freeing vehicles from ice, snow or mud ruts, the device comprising:
   an open equal sided rectangular metal channel;
   a metal lead screw which is attached firmly to a metal gear;
   a spur gear which meshes with said metal gear;
   a metal crank with a hand held handle which is permanently connected to said spur gear;
   a large rectangular metal nut which is driven by said metal lead screw, with the combination of said metal gear, said metal lead screw and said large rectangular metal nut housed in said open equal sided metal channel;
   an equal leg angle metal piece rigidly connected to said large rectangular metal nut;
   a metal equal leg angle slotted guide through which said equal leg angle metal piece slides;
   a metal plate with metal studs which is connected via a metal connecting linkage to said equal leg angle metal piece by a metal cap screw;
   a metal spring clamp which is connected rigidly to said equal leg angle metal piece and used to provide a spring force on said metal plate with metal studs;
   means of holding the manual pusher in a stored position when it is not in use, with said means being used in conjunction with said metal spring clamp; and means of attaching said apparatus to a vehicle.

* * * * *